(No Model.)
G. D. COLEMAN.
PROCESS OF MANUFACTURING WHITE LEAD.
No. 481,006. Patented Aug. 16, 1892.
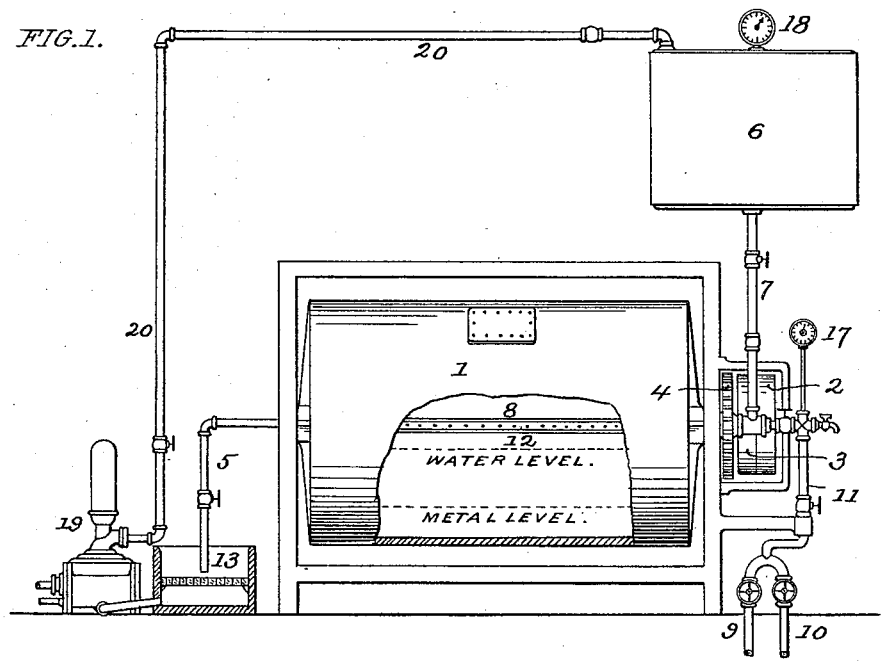
FIG. 1.
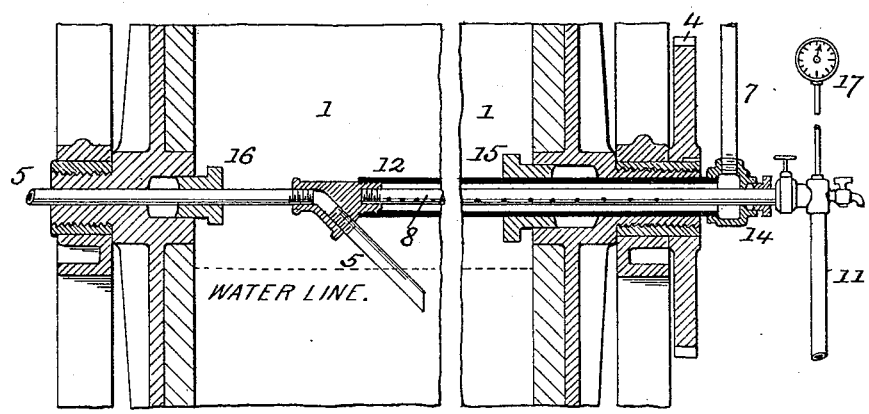
FIG. 3. FIG. 2.
FIG. 4.
FIG. 5.
ATTEST:
M. H. Holmes
INVENTOR:
Geo. D. Coleman,
by Robert Burns
Attorney.

UNITED STATES PATENT OFFICE.

GEORGE D. COLEMAN, OF CHICAGO, ILLINOIS.

PROCESS OF MANUFACTURING WHITE LEAD.

SPECIFICATION forming part of Letters Patent No. 481,006, dated August 16, 1892.

Application filed May 20, 1891. Renewed February 10, 1892. Serial No. 421,033. (No specimens.)

*To all whom it may concern:*

Be it known that I, GEORGE D. COLEMAN, a citizen of the United States, residing at Chicago, in the county of Cook and State of Illinois, have invented certain new and useful Improvements in the Process of Manufacturing White Lead; and I do hereby declare the following to be a full, clear, and exact description of the same, such as will enable others skilled in the art to which it appertains to make and use the same.

The present invention relates solely to that form of the attrition or tumbling process of manufacturing white lead in which the metallic lead in a shotted or comminuted condition is exposed to a rolling or tumbling attrition between the particles in the presence of atmospheric air, carbonic acid, and water, to the exclusion of any acid reagent (such as acetic or nitric acid) that would form a soluble salt of lead and contaminate the white lead or hydrocarbonate of lead that is produced with a crystalline impurity that materially detracts from the value of the white lead as a paint pigment.

The present improvement having as a basis the recognition and application of the primary and fundamental fact that the chemical reactions in the interior of the apparatus are greatly dependent upon and sensitive, as well as responsive, to even comparatively moderate physical changes of pressure and temperature, a want of recognition and an absence of control of said changes in former varieties of the tumbling process of making white lead have rendered all such attempts to manufacture white lead from a commercial point unsuccessful and abortive, based as they were upon the misconception that chemical forces alone needed attention and were to be depended upon alone to bring the development of the aforesaid tumbling process to a practical success.

My present improvement therefore consists in treating particles of metallic lead to the action of water, atmospheric air, and carbonic acid, to the entire exclusion of any acid or acids that would form a soluble or crystalline salt of lead at a defined and regulable temperature and degree of pressure, so as to insure the rapid production of a superior and uniform quality of white lead or lead hydrocarbonate, and which will be entirely free from any traces of a soluble crystalline salt of lead, usually the acetate, which is a very common and injurious impurity in the white lead of commerce, whether produced by the "Dutch" or "French" methods or modifications of the same.

In the accompanying drawings I illustrate an apparatus adapted to carry my present invention into practical effect.

In said drawings, Figure 1 is a general elevation, partly in section, of a form of apparatus adapted for use in carrying out my present process; Figs. 2 and 3, detail longitudinal or axial sections of the revolving cylinder and the connections thereto; Fig. 4, a detail elevation of the axially-arranged pipes through which the water and gases pass to the interior of the cylinder, and Fig. 5 a cross-section of the same at line *x x*.

Similar numerals of reference indicate like parts in the several views.

In the construction shown in the aforesaid drawings the cylinder or cask 1 for containing the comminuted lead, water, and gases is mounted in bearings on a suitable frame or base, so as to rotate, motion being communicated to the cylinder by any suitable means, preferably by tight and loose pulleys 2 and 3 upon a pinion-shaft that drives the spur-gear 4, keyed or otherwise secured to the hub or axle of the cylinder 1, the metal-level and the water-level being indicated by dotted lines in said figure, the water-level being a little below the axis of the cylinder and above the inner downwardly-projecting end or neck of the siphon or outlet-pipe 5. The finely-divided metallic lead is introduced into the cylinder through a hand-hole in any suitable manner, but preferably in a substantially-continuous manner automatically, and enough water is introduced to fully cover the lead, preferably in bulk, three or four times the amount of lead, the water-level being in any case below the axis of the cylinder.

Water is supplied to the cylinder 1 from an elevated closed tank 6 by a valved pipe 7, that connects with the axially-arranged pipe 8, arranged in the cylinder, which is of some diameter and slotted longitudinally, as shown, so as to discharge water in a very uniform manner.

The supply of carbonic-acid gas and air is received under pressure from any suitable source through the pipes 9 and 10, that join together in a commingling-pipe 11, that discharges into the interior of the cylinder through the longitudinally-extending perforated pipe 12, arranged concentrically within the slotted water-pipe 8, as clearly indicated in Figs. 2, 3, 4, and 5. The outlet from the cylinder is through the siphon or discharge-pipe 5, passing through the hollow axis of the cylinder and discharging into the tub or filter 13.

Packing-glands 14, 15, and 16 are provided on the axial parts to maintain tight joints between the pipes 12, 8, and 5 and the hollow axis of the cylinder, as clearly illustrated in Figs. 2 and 3.

In the construction illustrated 17 represents a pressure-gage connected to the inlet-pipe for the gases to indicate the pressure of the same, and 18 a similar gage for indicating the pressure of water in the tank 6.

19 is a suitably-constructed pump having its supply connected to the filter or tub 13 and its discharge connected to the elevated closed tank 6 by a pipe 20, the purpose being to cause a continuous circulation of the water from the tank 6 through the corroding-cylinder 1 to the filter 13, and from thence by means of the pump 19 returned back to the tank 6. The flow of the water may be, for an apparatus treating five hundred pounds of lead, in amount equal to the flow from a half-inch pipe and is constantly forced in from the elevated tank and the outflow filtered and pumped back to the tank.

The atmosphere forced into the cylinder preferably consists of a mixture of carbonic-acid gas and air in about equal proportions.

An undue accumulation of nitrogen within the corroding-chamber, due to the gradual abstraction of oxygen from the body of atmospheric air supplied to the corroding-chamber under pressure, may be avoided in any well-known manner—as, for instance, by "blowing off" at intervals of three or four hours through a suitable "bleeder-valve" arranged in the wall of the corroding-chamber.

In the practical carrying of my improved process into effect the following general directions may be observed: Charge the cylinder 1 (usually of a size four feet in diameter and five feet long) with five hundred pounds of granulated lead and sufficient water to reach the indicated water-level and carbonic-acid gas and air (mixed in equal volumes) to fill the space over the water. Then impart rotary movement to the cylinder (usually forty to sixty-five revolutions per minue) until the resultant product is of a bluish tint. Preserve a continuous inflowing and outflowing stream of water through the cylinder in order to attain the following results: The control and regulation of the temperature in the cylinder by increasing or decreasing the volume, temperature, or flow of the water and the washing out and removal of the products of corrosion from the cylinder, so as to keep the lead bright and clean and in the best possible condition for attrition, oxidation, and carbonation in a continuous manner and at the same time afford a continuous sample of the product for inspection and testing at the point where the pipe 5 discharges into the filter 13. In the present process the pressure and temperature are preserved constant and intact at or near a pressure of thirty pounds and a temperature of between 75° and 150° Fahrenheit. Under such conditions the carbonation of the contents of the cylinder takes place continuously, the product, where an absolutely-pure lead hydrocarbonate is required, being exposed to a subsequent treatment by the process described in my application for Letters Patent, Serial No. 361,096, filed August 5, 1890, which entirely removes or converts any trace of lead suboxide that may be in the aforesaid product into lead hydrocarbonate and removes all traces of the blue tint that may have been imparted to such product by the presence of a trace of lead suboxide.

Having thus fully described my said invention, what I claim as new, and desire to secure by Letters Patent, is—

1. The herein-described improvement in the art of making white lead by the agitation of lead in a comminuted state in the presence of water, air, and carbonic acid, the same consisting in carrying on the process at a regulated temperature of from 75° to 150° Fahrenheit and under a pressure of from fifteen to thirty pounds, substantially as herein described.

2. The herein-described improvement in the art of making white lead by the agitation of lead in a comminuted state in the presence of water, air, and carbonic acid, the same consisting in carrying on the process at a regulated temperature of from 75° to 150° Fahrenheit and under a pressure of from fifteen to thirty pounds and preventing by a flow of water an abnormal rise in such temperature due to physical and chemical reactions in the apparatus, substantially as herein described.

In testimony whereof I have hereunto set my hand in the presence of two subscribing witnesses.

GEORGE D. COLEMAN.

Witnesses:
KNOWLTON L. AMES,
ROBERT BURNS.